United States Patent [19]

Scherzer

[11] Patent Number: 4,477,336

[45] Date of Patent: Oct. 16, 1984

[54] ACID DEALUMINATED Y-ZEOLITE AND CRACKING PROCESS EMPLOYING THE SAME

[75] Inventor: Julius Scherzer, Anaheim, Calif.

[73] Assignee: Harshaw/Filtrol Partnership, Oakland, Calif.

[21] Appl. No.: 512,320

[22] Filed: Jul. 11, 1983

Related U.S. Application Data

[63] Continuation of Ser. No. 354,055, Mar. 2, 1982, abandoned.

[51] Int. Cl.³ .................. C10G 11/05; C10G 47/20
[52] U.S. Cl. ................................ 208/120; 208/111; 502/67
[58] Field of Search ................... 208/111, 120; 502/67

[56] References Cited

U.S. PATENT DOCUMENTS 3,804,747  4/1974  Kimberlin, Jr. et al. ....... 252/455 Z
4,218,307  8/1980  McDaniel ....................... 252/455 Z Primary Examiner—Delbert E. Gantz
Assistant Examiner—O. Chaudhuri
Attorney, Agent, or Firm—Andrew E. Barlay

[57] ABSTRACT

Cracking of hydrocarbons with a mixture of acid dealuminated, rare earth metal exchanged Y-zeolite having a $SiO_2/Al_2O_3$ molar ratio of more than about 6 and not more than about 300, and non-dealuminated rare earth metal exchanged Y-zeolite and a matrix.

4 Claims, No Drawings

ACID DEALUMINATED Y-ZEOLITE AND CRACKING PROCESS EMPLOYING THE SAME

This is a continuation of application Ser. No. 354,055, filed Mar. 2, 1982, now abandoned.

This invention relates to cracking catalyst containing an acid dealuminated faujasite type zeolite. As is well known in the art, faujasite type zeolites, particularly X and Y zeolites, may be treated to remove substantial proportion of the alumina from the zeolite framework without destruction of the lattice.

The procedures for dealumination whereby the faujasite framework is reduced in alumina content are well known in this art. See particularly, "Zeolite Chemistry and Catalysis," Jules A. Rabo, editor, ACS Monograph 1971, pgs. 318, et seq.; Julius Scherzer "Dealuminated Faujasite-Type Structures with $SiO_2/Al_2O_3$ Ratios over 100," Journal of Catalysis, Vol. 54, pgs. 285–288 (1978).

Such dealuminated zeolites have been employed in forming cracking catalysts (see particularly, Kerr, et al., U.S. Pat. No. 3,442,795, patented May 6, 1965; Eberly, Jr., et al., U.S. Pat. No. 4,218,307, patented Apr. 14, 1970 and U.S. Pat. No. 3,591,488, patented July 6, 1971 and McDaniel, U.S. Pat. No. 4,218,307, patented Aug. 19, 1980).

The acid dealuminated Y made according to my above article is derived from an ammonium exchanged Y zeolite with relatively low sodium content which is calcined under hydrothermal conditions prior to dealumination by the acid.

The Y zeolite which has been calcined according to the hydrothermal procedure according to my above article, has a substantially different lattice constant $a_o$ compared to one with like $SiO_2/Al_2O_3$ molar ratios which had not been hydrothermally calcined, prior to acid treatment.

STATEMENT OF THE INVENTION

As is explained in my aforesaid article, static hydrothermal calcination is made by calcining the exchanged Y in the presence of steam generated in a bed of the wet exchanged zeolite, for example, of 3 or more inches in depth. Dynamic hydrothermal calcination may be accomplished by passing steam over the heated catalyst. The calcination of the exchanged Y may be made in one or two stages with intermediate further exchange as described by the aforesaid article. The calcination temperature as described is in the range of 500° C. to 870° C.

Such dealuminated zeolites produced from such hydrothermally calcined zeolites are substantially improved as cracking catalysts when exchanged with polyvalent cations such as rare earth cations.

An additional improvement is obtained by mixing the zeolite dealuminated according to the Scherzer article with undealuminated low sodium Y zeolite. The term low sodium undealuminated Y is defined below in this specification.

A zeolite of the faujasite type, zeolite Y of a suitably lower sodium content, dealuminated by acid leaching according to the procedure described in said Scherzer article, so as to adjust the silica to alumina molar ratios to over about 6 and up to about 300, may be used to produce highly active cracking catalysts which have materially improved carbon forming properties. Such zeolite catalysts, according to this invention, have low sodium content and may contain other cations such as monovalent cations, other than alkali metal cations, hydrogen or ammonium or polyvalent cations, such as Group II, the transition elements, and rare earth cations. Catalysts containing such zeolites display high thermal and hydrothermal stability. They show good activity for catalytic cracking of gas oils and residual oils with low coke yields.

As is described in said Scherzer article (which is incorporated into this specification by this reference), dealumination of a zeolite of the faujasite type by acid leaching is obtained by the acid leaching of a low sodium Y which has been hydrothermally treated at an elevated temperature. The hydrothermal treatment includes calcination of a wet zeolite in a static atmosphere (deep bed calcination) or dynamic hydrothermal calcination under flow of steam. The calcination can be done at temperatures in the range of from about 500° C. to about 870° C.

The hydrothermally treated zeolite is acid leached with a mineral acid, for example, hydrochloric or nitric acid. The reaction conditions are controlled so that the treated zeolite has a total silica to alumina molar ratio in the range of from about 6 to about 300.

The preliminary static hydrothermal treatment of the zeolite, for example, a Y zeolite which has been exchanged, for example, with ammonium cation to reduce the sodium content to less than about 2–3% by weight of the zeolite (expressed as $Na_2O$ on a volatile free basis), washed, is described in said Scherzer article.

The wet filter cake of the exchanged Y is placed in a furnace so as to establish a deep wet bed and calcined by heating to a temperature in the range of 500° to 600° C.

The calcined exchanged Y may be further exchanged to reduce the sodium content to below one weight percent, expressed as $Na_2O$ on a volatile free basis.

The wet filter cake of the re-exchanged Y is again calcined under the conditions stated above but at a higher temperature in the range of about 800° to 900° C.

Instead of hydrothermally calcining the zeolite by heating a deep bed, as described above, the hydrothermal calcination may be accomplished at the above temperatures by passing steam over a shallow bed at the above temperature.

The calcined low sodium Y is heated with mineral acid, for example HCl, at an elevated temperature and filtered and washed. The resultant dealuminated zeolite which may be further exchanged with polyvalent cations is mixed with a matrix which may be such as has been used in the prior art in forming cracking catalysts, and spray dried to form microspheres.

Catalytic activity and hydrothermal stability of the microspheres is determined by a test procedure described in the Appendix. The activity is determined by the test after steaming for two hours at 1450° F. and this is referred to as "M" activity. A separate sample is steamed at 1500° F. for two hours and then tested and the activity is referred to as "S" activity. A third sample is steamed for two hours at 1550° F. and the activity determined on that sample is called "S+" activity. The coke producing factor (CPF) is a measure of the relative production of coke when compared with a standard when tested at the above parameters, as described in the Appendix.

Thermal stability is the greater, the greater the value of the S+ activity. Selectivity at the various test conditions is the greater, the lower the coke producing factor.

Acid leached dealuminated Y zeolite with a total $SiO_2/Al_2O_3$ ratio, preferably in the range of more than about 6, and not more than about 300, as determined by chemical analysis of a well washed sample with an x-ray spectrum and lattice constant $a_o$, which identifies it as a faujasite type zeolite, show good activity and selectivity as cracking catalysts. However, it is the catalytic selectivity and the high thermal stability which particularly makes them superior to conventional catalysts.

The relatively low coke producing factor (CPF) of the catalyst of my invention makes the catalysts specially attractive, since the low coke producing factor allows for higher liquid to catalyst oil ratios in the reactor and longer run times before regeneration is required and also points in the direction of higher yields and the production of higher octane gasolines.

The high thermal stability of these zeolites permits using catalysts containing such zeolite at a higher cracking temperature, making them especially suitable for cracking of residual fractions. The dealuminated zeolites preferably when further exchanged with polyvalent cations, can be used by themselves or by formulations with other exchanged zeolites.

The acid-leached dealuminated acid zeolite may be used together with a matrix, such as have been commonly used for catalysts containing faujasite type zeolites. Such matrixes have included clay and inorganic oxides such as alumina, particularly pseudoboehmite, silica gels and silica-alumina cogels.

The following examples illustrate my invention.

EXAMPLE I

A sodium Y of $SiO_2/Al_2O_3$ ratio of 5 and containing about 13.3% sodium, when expressed as the equivalent $Na_2O$ on a volatile free basis, was treated with 10% solution of ammonium sulfate using 10 ml. solution per gram of the zeolite on a volatile free basis. The exchange was carried on for an hour at room temperature (ambient temperature) while stirring. The slurry was filtered and the filter cake washed until the filtrate was substantially sulfate free. The filter cake was again exchanged, filtered and washed as before. The washed filter cake was arranged in a deep bed (about 3 inches thick) and heated at 540° C. for two hours. The calcined zeolite was again exchanged twice as before, except that the temperature of exchange was 90° C. and the zeolite to $(NH_4)_2SO_4$ to water weight ratio was 1:2:10. The washed filtercake was arranged in a deep bed, as before, and calcined at a temperature of 815° C. for three hours.

The calcined zeolite had the following composition:

$SiO_2/Al_2O_3 = 5.0$ $Al_2O_3 = 25.2\%$ $Na_2O = 0.35\%$ unit cell = 24.36 Å

The Surface Area by the B.E.T. method (see Appendix) was 501 $m^2/gm$. A zeolite of like $SiO_2/Al_2O_3$ ratio which has not been subjected to the deep bed calcination would show a substantially higher $a_o$ in the range of about:

$a_o = 24.6 \pm 0.1$ Å

This is illustrated by Example I of the aforementioned McDaniel U.S. Pat. No. 4,218,307. A repetition of said Example I yielded a product having a $SiO_2/Al_2O_3$ ratio of 5, a $Na_2O$ content of 0.29% by weight volatile free and an $a_o$ of 24.61 Å.

EXAMPLE II 1600 grams of calcined zeolite produced as in Example I, were treated with 16000 ml of one normal hydrochloric acid for two hours at 60° C. with stirring. The zeolite was filtered and washed substantially chloride free and the filter cake was analyzed as:

$Al_2O_3 = 20.2\%$ $Na_2O = 0.35\%$

The $SiO_2/Al_2O_3$ molar ratio of the zeolite was 6.7 and surface area determined by the BET method (see Appendix) was 545 square meters per gram.

The sample was x-rayed and the $a_o$ of the unit was determined to be 24.35 Å.

EXAMPLE III 25 grams of calcined zeolite, produced as in Example I, were treated with 25 grams of $Na_2$ EDTA in 250 ml of $H_2O$ for nine hours at 100° C. with agitation. The zeolite was filtered and washed substantially chloride free and the filter cake was analyzed as:

$Al_2O_3 = 14.0\%$ $Na_2O = 3.3\%$

The $SiO_2/Al_2O_3$ molar ratio of the zeolite was 9.9. The sample was x-rayed and $a_o$ of the unit cell was determined to be 24.35 Å.

The result of the deep bed calcination as in Example I compared with not using such deep bed calcination as in Example I of McDaniel patent (see above under Example I, supra), is that the similar degree of dealumination to a level of about 9 $SiO_2/Al_2O_3$ ratio did, in McDaniel, result in a substantial decrease in $a_o$ to 24.50 Å from 24.61 Å; whereas in the case of the treatment in this Example III there was substantially no change from $a_o = 24.36$ Å to $a_o = 24.35$ Å

EXAMPLE IV 420 grams of the calcined zeolite, produced as in Example I, was treated with 4200 milliliters of one normal hydrochloric acid at 60° C. for two hours with stirring. The zeolite was filtered and washed until the filtrate was substantially free of chloride and the filter cake was analyzed as:

$Al_2O_3 = 12.2\%$ $Na_2O = 0.1\%$

The $SiO_2/Al_2O_3$ molar ratio of the zeolite was 12 and the surface area determined by the BET method (see Appendix) was 658 meters square per gram.

The sample was x-rayed and the $a_o$ of the unit cell was determined at 24.33 Å.

EXAMPLE V 1000 grams of calcined zeolite, produced as in Example I, were treated with 10000 ml of one normal hydrochloric acid for three hours at 90° C. with stirring. The zeolite was filtered and washed substantially chloride free and the filter cake was analyzed as:

$Al_2O_3 = 9.06\%$ $Na_2O = 0.30\%$

The $SiO_2/Al_2O_3$ molar ratio of the zeolite was 16.9. The sample was x-rayed and the $a_o$ of the unit cell was determined to be 24.33 Å.

EXAMPLE VI 1000 grams of calcined zeolite, produced as in Example I, were treated with 10000 ml. of two normal hydrochloric acid for two hours at 35° C. with stirring. The zeolite was filtered and washed substantially chloride free and the filter cake was analyzed as:

$Al_2O_3 = 5.7\%$ $Na_2O = 0.10\%$

The $SiO_2/Al_2O_3$ molar ratio of the zeolite was 28 and the Surface Area determined by the BET method (see Appendix) was 634 square meters per gram.

The sample was x-rayed and the $a_o$ of the unit cell was determined to be 24.26 Å.

EXAMPLE VII 420 grams of calcined zeolite, produced as in Example I, were treated with 4200 ml of two normal hydrochloric acid for 0.5 hours at 60° C. with stirring. The zeolite was filtered and washed substantially chloride free and the filter cake was analyzed as:

$Al_2O_3 = 4.8\%$ $Na_2O = 0.02\%$

The $SiO_2/Al_2O_3$ molar ratio of the zeolite was 32 and the Surface Area was 635 m²/g and the unit cell size was 24.25 Å.

EXAMPLE VIII 288 grams of the material of Example VII was subjected to a two normal hydrochloric acid solution for 1.5 hours at 75° C. with stirring. The zeolite was subsequently washed substantially chloride free and the filter cake was analyzed as:

$Al_2O_3 = 1.6\%$ $Na_2O = 0.03\%$

The $SiO_2/Al_2O_3$ molar ratio of the zeolite was 102 and the Surface Area was 600 m²/gm. and the unit cell was 24.21 Å.

EXAMPLE IX 130 grams of calcined zeolite, produced as in Example I, were treated with 1300 ml of two normal hydrochloric acid for two hours at 90° C. with stirring. The zeolite was filtered and washed substantially free of chloride and was again subjected to 1300 ml of two normal hydrochloric acid for two hours at 90° C. with stirring. The zeolite was subsequently filtered and washed substantially chloride free and the filter cake was analyzed as:

$Al_2O_3 = 0.97\%$ $Na_2O = 0.04\%$

The $SiO_2/Al_2O_3$ molar ratio of the zeolite was 170 and the Surface Area was determined by the BET method (see Appendix) was 678 square meters per gram.

The sample was x-rayed and the $a_o$ of the unit cell was determined to be 24.21 Å.

EXAMPLE X 130 grams of calcined zeolite produced as in Example I, were treated with 1300 ml of two normal hydrochloric acid for four hours at 90° C. with stirring. The zeolite was filtered and washed substantially free of chloride and was again subjected to 1300 ml of two hydrochloric acid for four hours at 90° C. with stirring. The zeolite was subsequently filtered and washed substantially chloride free and the filter cake was analyzed as:

$Al_2O_3 = 0.70\%$
$Na_2O = 0.03\%$

The $SiO_2/Al_2O_3$ molar ratio of the zeolite was 236 and the Surface Area determined by the BET method (see Appendix) was 660 square meters per gram.

The sample was x-rayed and the $a_o$ of the unit cell was determined to be 24.23 Å.

EXAMPLE XI 100 grams of calcined zeolite produced as in Example I, were treated with 1000 ml of five normal hydrochloric acid for six hours at 90° C. with stirring. The zeolite was filtered and washed substantially chloride free and the filter cake was analyzed as:

$Al_2O_3 = 0.57\%$ $Na_2O = 0.01\%$

The $SiO_2/Al_2O_3$ molar ratio of the zeolite was 300. The sample was x-rayed and the $a_o$ of the unit cell was determined to be 24.24 Å.

The dealuminated zeolites, such as the product produced according to Examples II through XI, may be exchanged with monovalent and polyvalent cations, similar to zeolites of the prior art which have not been dealuminated.

The exchange, according to my invention, may be made both under ordinary atmospheric pressure or superatmospheric pressure, for example, from about ambient temperature to about 500° F. under autogenous superatmospheric pressure.

Cations, which are suitable, are, in addition to the H of the dealuminated zeolite, $NH_4^+$, I prefer, however, cations chosen from the Group II metals, such as Ca and Mg and the transition elements, including lanthanum and the other lanthanide rare earth metals.

EXAMPLE XII 600 grams of material of Example II were exchanged with 60 grams of rare earth chloride in 4400 ml of water. A temperature of 35° C. was maintained under constant agitation for one hour. The exchanged zeolite was filtered and washed substantially chloride free and the filter cake was analyzed as:

Na$_2$O = 0.29%

REO = 1.2%

The SiO$_2$/Al$_2$O$_3$ molar ratio of the zeolite was 6.7. The sample was x-rayed and the a$_o$ of the unit cell was determined to be 24.34 Å.

The following examples illustrate, but are not limited to specific examples of the preferred aspects of my invention.

EXAMPLE XIII

Each of the dealuminated zeolites produced as in Examples II, V, VI and XII were each separately combined by incorporating 25% of the zeolite with 17% of pseudoboehmite and 55.5% of ball clay and 2.5% of ammonium polysilicate (expressed as SiO$_2$). The dealuminated zeolites of Examples III, IV and VII through XI were each separately combined by incorporating 24% of the zeolite with 18% of pseudoboehmite and 55.5% of ball clay and 2.5% of ammonium polysilicate (expressed as SiO$_2$). (See Lim, et al., U.S. Pat. No. 4,085,069.) The mixture was passed through a mill and the milled product was formed into spray dried microspheres. The above percentages are by weight based on the spray dried product on a volatile free basis.

EXAMPLE XIV

A rare-earth exchanged sodium Y zeolite having the following composition was further exchanged with ammonium sulfate to reduce the sodium content.

The rare-earth sodium Y had the following composition on a volatile free basis:

SiO$_2$ = 61.0%

Al$_2$O$_3$ = 22.3%

ReO* = 11.5%

Na$_2$O = 4.96%

*ReO are the mixed rare earth cations expressed as oxide as determined by the oxalate method.

The zeolite was calcined at 1000° F. for two hours, and was further exchanged at 100° C. for two hours to reduce the sodium content with ammonium sulfate. The re-exchanged zeolite was filtered and washed until the wash water was substantially free of sulfate ion. The sodium content of the filter cake expressed as the equivalent Na$_2$O on a volatile free basis was 1.2 Na$_2$O.

EXAMPLE XV

The dealuminated product of Example II was combined in varying amounts with the material of Example XIV such that the total amount of zeolite in a catalyst formulation was 30% (by weight). The balance of the catalyst formulation subjected to spray drying consisted of 18% pseudoboehmite and 52% ball clay, all calculated on a volatile free basis.

The catalytic properties of the resultant catalyst is stated in Table III.

EXAMPLE XVI

Catalyst was formulated as in Example XV with the product of Example VI instead of Example II. The catalytic properties of the resulting catalysts are described in Table III.

Table I lists the SiO$_2$/Al$_2$O$_3$ molar ratio, the Na$_2$O content, the a$_o$ and the Surface Area of the dealuminated zeolites of Examples I–XI as well as the microactivity of these zeolites incorporated in catalyst formulations as described in Example XIII.

Table II compares the microactivity of dealuminated zeolite of Example II with the rare earth exchanged dealuminated zeolite of Example XII incorporated in catalyst formulations as described in Example XIII.

The microactivity results of the catalyst formulation of Examples XV and XVI are tabulated in Table III.

TABLE I

| Example | SiO$_2$—Al$_2$O$_3$ | % Na$_2$O | a$_o$ | SA m$^2$/gm | Microactivity after treatment as described in Example VIII | | | | | |
|---|---|---|---|---|---|---|---|---|---|---|
| | | | | | M | CPF | GPF | S+ | CPF | GPF |
| I | 5.00 | 0.35 | 24.36 | 501 | | | | | | |
| II | 6.7 | 0.35 | 24.35 | 515 | 65 | 1.0 | 1.2 | 51 | 0.9 | 1.2 |
| III | 9.9 | 0.33 | 24.35 | 577 | | | | | | |
| IV | 12.0 | 0.1 | 24.33 | 600 | 65 | 0.92 | 1.04 | 53 | 0.85 | 1.1 |
| V | 16.9 | 0.3 | 24.33 | 600 | 73 | 0.9 | 1.4 | 49 | 0.8 | 1.7 |
| VI | 28.0 | 0.1 | 24.26 | 634 | 63 | 0.9 | 1.3 | 54 | 0.8 | 1.0 |
| VII | 32.0 | 0.07 | 24.25 | 635 | 58 | 0.88 | 1.24 | 44 | 1.07 | 1.17 |
| VIII | 102.0 | 0.02 | 24.21 | 600 | 52 | 0.93 | 1.3 | 45 | 0.95 | 1.2 |
| IX | 170.0 | 0.04 | 24.21 | 678 | 57 | 0.84 | 1.31 | 46 | 0.85 | 1.11 |
| X | 236.0 | 0.03 | 24.23 | 660 | 56 | 0.84 | 1.27 | 47 | 0.82 | 1.21 |
| XI | 300.0 | 0.01 | 24.24 | 620 | 52 | 0.97 | 1.66 | 45 | 0.99 | 1.65 |

TABLE II

Effect of ReO Exchange
Catalysts formulated as described in Example XIII
Dealuminated Zeolite:

| Example | II | XII |
|---|---|---|
| SiO$_2$/Al$_2$O$_3$ | 6.7 | 6.7 |
| % Na$_2$O | 0.35 | 0.29 |
| % ReO | — | 1.2 |
| a$_o$ | 24.35 | 24.34 |
| SA m$^2$/gm | 515 | 547 |
| Activity: | | |
| % DeAl Zeolite | 25 | 25 |
| M | 65 | 73 |
| CPF | 1.0 | 0.8 |
| GPF | 1.2 | 0.6 |
| S | 60 | 68 |
| CPF | 0.9 | 1.4 |
| GPF | 1.1 | 0.8 |
| S+ | 57 | 58 |
| CPF | 0.9 | 0.9 |
| GPF | 1.2 | 1.1 |

TABLE III

| Example | SiO$_2$—Al$_2$O$_3$ | % DeAl. Zeolite | %* Zeolite Ex. XIV | % Zeolite (Total) | M | CPF | GPF | S | CPF | GPF | S+ | CPF | GPF |
|---|---|---|---|---|---|---|---|---|---|---|---|---|---|
| II | 6.7 | 30 |    | 30 | 73 | 0.8 | 1.4 | 73 | 0.89 | 1.4 | 61 | 0.8 | 1.2 |
| II | 6.7 | 15 | 15 | 30 | 78 | 1.1 | 0.8 | 76 | 0.9 | 0.9 | 61 | 0.8 | 1.0 |
| II | 6.7 | 20 | 10 | 30 | 78 | 1.0 | 1.1 | 74 | 0.9 | 1.1 | 60 | 0.7 | 1.0 |
| II | 6.7 | 25 | 5  | 30 | 75 | 0.9 | 1.2 | 77 | 1.1 | 1.3 | 57 | 0.7 | 0.9 |
| VI | 28  | 30 |    | 30 | 65 | 0.9 | 1.6 | 56 | 0.9 | 1.4 | 54 | 0.9 | 1.0 |
| VI | 28  | 15 | 15 | 30 | 78 | 1.1 | 0.8 | 71 | 0.9 | 0.7 | 49 | 0.9 | 0.9 |
| VI | 28  | 20 | 10 | 30 | 78 | 0.9 | 0.9 | 70 | 0.9 | 0.9 | 51 | 0.9 | 1.2 |
| VI | 28  | 25 | 5  | 30 | 71 | 1.0 | 1.2 | 62 | 1.0 | .2  |    |     |     |

*% by weight of the catalyst (zeolite + matrix) on a volatile free basis

The acid dealumination of the low sodium deep bed calcined zeolite to a SiO$_2$/Al$_2$O$_3$ ratio of less than about 30 yields dealuminated zeolites with substantially the same catalytic activity. As is illustrated by Table I, the activities (M, S and S+) are all substantially the same in the range above SiO$_2$/Al$_2$O$_3$ ratio of about 6 and less than about 30. There is a substantial decrease when the SiO$_2$/Al$_2$O$_3$ ratio increases beyond about 30 in the range up to 300 showing a substantial decreas in M activity with substantially no change in S+ activity.

It is significant to note that the carbon forming properties (CPF) and dehydrogenation properites (GPF) as evidenced by a low CPF and GPF for M and S+ activity is substantially the same for all values of SiO$_2$/Al$_2$O$_3$ from about 6 to 300 SiO$_2$/Al$_2$O$_3$ ratio. The low values of the GPF and CPF indicates the excellent selectivity of the catalyst showing the excellent properties of the dealuminated zeolite catalyst of my invention in producing high gasoline yields of good octane values.

Table II illustrates the effect of exchanging the acid dealuminated zeolite with a polyvalent cation. The addition of rare earth by exchange of the dealuminated zeolite has a substantial effect on increasing the activity of the zeolite when combined into a catalyst. The increase in the activity does not reduce the CPF or the GPF of the catalyst.

The undealuminated Y zeolite improves the M activity of the dealuminated zeolite without materially affecting the selectivity and stability of the catalyst containing only dealuminated zeolite.

The zeolite in the catalyst composition with the matrix may be constituted of mixtures of the dealuminated Y zeolite and the undealuminated Y zeolite of less than about 3% by weight expressed as Na$_2$O on a volatile free basis, low sodium zeolite in ratios of from about 10 to 60% by weight of the catalyst (zeolite plus matrix) on a volatile free basis.

The prior art has described various procedures for reducing the sodium content of a sodium Y to substantially less than 2%, expressed as Na$_2$O on a volatile free basis, other than by adding dealuminated zeolite. Such processes have included hydrothermal processes whereby wet partially exchanged Y is dried or calcined by heating of the dried zeolite. Such low sodium zeolites having SiO$_2$/Al$_2$O$_3$ ratios of less than 6 which have not been dealuminated by any of the prior art cited above herein are here included by the term undealuminated.

In accordance with my invention, the undealuminated Y zeolite is one having a SiO$_2$/Al$_2$O$_3$ ratio less than 6 and is a low sodium Y having sodium concentration when expressed as the equivalent Na$_2$O of less than about 3% by weight of the low sodium undealuminated Y on a volatile free basis.

Table III illustrates the synergistic effect of combining a low sodium undealuminated zeolite with the low sodium acid dealuminated hydrothermally calcined zeolite. As will be observed, the substitution of about 1/10 to ⅓ of the lower activity dealuminated zeolite by the high activity low sodium zeolite has raised the activity of the catalyst to that produced from the higher activity catalyst of like total zeolite concentration.

It will also be observed that the selectivity of the composite catalyst as evidenced by the CPF and GPF is substantially unchanged by the substitution of up to ⅓ to ½ of the high activity zeolite in the catalyst.

The substitute of as little as 4% of the dealuminated zeolite by a low sodium non-dealuminated Y zeolite of relatively low SiO$_2$/Al$_2$O$_3$ ratio (see Example VII) makes a substantial improvement in "M" activity without materially affecting the selectivity, as is evidenced by the CPF and GPF, or the thermal stability of the catalyst as is evidenced by the S+ values.

It is therefore, an object of my invention to form a cracking catalyst by combining with a matrix an acid dealuminated hydrothermally calcined Y zeolite of SiO$_2$/Al$_2$O$_3$ molar ratio of more than 6 and not more than about 300, and preferably less than about 30, and having an a$_o$ less than about 24.4 Angstroms, substantially free of sodium, for example less than 0.5% by weight of the zeolite expressed as the equivalent Na$_2$O on a volatile free basis. Preferably the dealuminated zeolite is in an exchange form with a cation other than an alkali metal cation such as a polyvalent cation, such as described above, preferably such as rare earth cations or both NH$_4$ and rare earth cations.

The zeolite which is subjected to hydrothermal treatment prior to dealumination is preferably one having a diminished sodium content and may carry other nonmetallic monovalent cations such as NH$_4$+ or H+. The sodium content may be less than about 0.5% by weight of the zeolite when expressed as the equivalent Na$_2$O on a volatile free basis.

In forming catalysts comprising mixtures of dealuminated Y and undealuminated Y, we may see the undealuminated Y from about 1 to about 90%, preferably about 10 to about 50% of the mixture of zeolites on a volatile free basis.

The best mode of the catalyst of my invention contemplated by me is set forth in the catalyst formed by using the dealuminated zeolite of Example II and preferably using a mixture of the dealuminated zeolite of Example II and a low sodium zeolite of Example XIV in ratios of one part of Example II to one part of Example XIV to about five parts of Example II to one part of Example XIV as illustrated in Table III.

APPENDIX

Micro-Activity Test

A test oil (ASTM Subcommittee D-32, Standard FHC 893) is vaporized and passed through a bed of microspheres produced by spray drying of the catalyst. Spray dried microspheres of the catalyst are of a particle size within the range of 50-70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil is passed through a preheat zone and through a bed of microspheres maintained at a temperature of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which are hydrogen, isopentane, and hexanes, is determined and their weight percent of the feed determined.

The carbon on the spent catalyst is determined by burning the carbon on the catalyst with oxygen to produce $CO_2$ and the weight of carbon is determined from the weight of $CO_2$.

The hydrogen and carbon is reported as the weight percent based on the feed.

The weight percent of the liquid charge is determined from the following relation:

F is the weight of the oil passing through the reactor;
L is the weight of the liquid product which is collected as condensate;
R is the percent by weight of the fraction of the liquid condensate which boils above 421° F.;
H is the grams liquid held up in the reactor exit line and around the reactor, receiver and joints.

In the above test it has been determined that it constitutes three percent (3%) of the feed F. The weight percent conversion (%C) is given by the following relationship.

$$\%C = \frac{F - \frac{R \times L}{100} - H}{F} \times 100$$

The conversion using the catalyst steamed at 1450° F. is termed M conversion, the one steamed at 1500° F. is termed S conversion, and the one steamed at 1550° F. is termed S+ conversion.

CARBON AND GAS CONVERSION FACTORS $$CPF^* = \frac{\text{wt. \% of } C_2 \text{ produced}}{Y}$$

$\log Y = 0.0232 \text{ (conversion wt. \%)} - 0.235$
*CPF = Carbon Conversion Factor $$GPF^{**} = \frac{\text{wt. \% of } H_2 \text{ produced}}{X^*}$$

*$X = (.000214)(\text{conversion wt. \%}) + 0.059$
**GPF = Gas Conversion Factor
Applies for conversion under 75%.

SURFACE AREA

The identification of B.E.T. surface areas of pores of various configurations in any system of porous solids is empirically determined. A common method is to employ nitrogen to develop an adsorption isotherm and also in some cases a desorption isotherm. The value of the total pore volumes, the total surface area of the pores of a porous solid are determined from the isotherms [see Brunauer, "Adsorption of Gases and Vapors", Vol. 1, Princeton University Press, 1943, Brunauer, et al., J.A.C.S., Vol. 60, pgs. 390, etc. (1938)].

The distribution of the values of the pore volume and surface area in various ranges of the equivalent pore diameters in a heterogeneous pore structure may be determined from the nitrogen isotherms.

A widely used test and one employed in the determination of the B.E.T. surface areas in this application determines them from nitrogen isotherms and employs a computerized apparatus. (Digisorb 2500, manufactured by the Micrometric Instrument Corp. of 5680 Goshen Springs Road, Norcross, Ga. 30071.)

The sample is dried by heating at about 500° F. until it is volatile free. The procedure employing this instrument determines the parameters for a nitrogen adsorption and a desorption isotherm and determines the so-called B.E.T. surface area by application of the equation as given on page 312 of the above J.A.C.S. article (known as the B.E.T. equation). The slope and intercept of the linear relation according to that equation is determined. The equation evaluates the volume of the gas as a mono-molecular layer of nitrogen adsorbed on the surfaces of the pores. From the known diameter of the nitrogen molecule and the volume of the mono-layer, the magnitude of the surface of the pores carrying the mono-layer is evaluated. To evaluate the slope and intercept of the above linear relation, the separate values of the relative pressure (P/Po) of the selected portion of the isotherm are chosen. P is the local pressure selected and Po is the saturation pressure. The linear relation is determined as the least square fit to the above B.E.T. linear equation.

The B.E.T. Surface area (S) in meters square per gram is given by the following equation which includes the value of the area covered by the nitrogen molecule 16.2 $A^2$. According to the equation:

$$S = 4.35/(a+b) \qquad \text{Equation 1}$$

where S is the Surface area in square meters per gram ($m^2/gm$); "a" is the above intercept of the linear relation and "b" is the slope of said linear relation. This value is referred to as the B.E.T. surface, and is so referred to in this application.

I claim:

1. In the process of catalytically cracking hydrocarbons undercracking conditions in the presence of a zeolite-containing catalyst, the improvement which comprises employing for the catalytic cracking of hydrocarbons a zeolite composition consisting of a mixture of dealuminated, rare earth metal exchanged Y-zeolites and nondealuminated rare earth metal exchanged Y-zeolites and a matrix, wherein the catalyst composition contains about 30% by weight of Y-zeolite mixture, calculated on the volatile free basis and wherein the quantity of the dealuminated Y-zeolite incorporated in the mixture is in the range of about 10% by weight to about 99% by weight, the dealuminated Y-zeolite being characterized by a total silica-to-alumina ($SiO_2/Al_2O_3$) molar ratio of more than about 6 and not more than about 300, a sodium content, expressed as $Na_2O$ on a volatile-free basis of less than about 0.5% by weight and an $a_o$ of less than about 24.4 Angstroms.

2. The process of claim 1 wherein the quantity of dealuminated Y-zeolite incorporated in the mixture is from about 50% by weight to about 90% by weight.

3. The process of claim 1, wherein the matrix of the catalyst composition is selected from clay or inorganic oxides, or mixtures thereof.

4. The process of claim 3, wherein the inorganic oxide is selected from alumina, silica gel, or silica-alumina gels or mixtures thereof.

* * * * *

UNITED STATES PATENT AND TRADEMARK OFFICE
CERTIFICATE OF CORRECTION

PATENT NO. : 4,477,336

DATED : October 16, 1984

INVENTOR(S) : Julius Scherzer

It is certified that error appears in the above—identified patent and that said Letters Patent are hereby corrected as shown below:

Column 12, line 24, "390," should be --309,--

Signed and Sealed this

Third Day of September 1985

[SEAL]

Attest:

DONALD J. QUIGG

Attesting Officer     Acting Commissioner of Patents and Trademarks - Designate